United States Patent [19]

Alexanderson

[11] 4,117,055

[45] Sep. 26, 1978

[54] LOW MASS, HIGH ALUMINA-SILICA REFRACTORIES

[75] Inventor: Walter Howard Alexanderson, Augusta, Ga.

[73] Assignee: The Babcock & Wilcox Company, New York, N.Y.

[21] Appl. No.: 835,073

[22] Filed: Sep. 20, 1977

[51] Int. Cl.² .................. B28B 1/08; C04B 35/10; C04B 35/14

[52] U.S. Cl. .................. 264/56; 106/40 R; 106/65; 106/68; 264/71; 264/86

[58] Field of Search .................. 106/68, 67, 40 R, 73; 264/71, 86, 56

[56] References Cited

U.S. PATENT DOCUMENTS

| | | | |
|---|---|---|---|
| 3,121,640 | 2/1964 | Miller | 106/68 |
| 3,269,850 | 8/1966 | Miller | 106/40 R |
| 3,992,213 | 11/1976 | Desouches | 106/65 |

Primary Examiner—Helen McCarthy
Attorney, Agent, or Firm—J. M. Maguire; R. C. Mai

[57] ABSTRACT

A low mass thixotropic alumina-silica refractory mix for producing kiln furniture having smooth surfaces combined with low weight and consequent low heat capacity.

3 Claims, 1 Drawing Figure

A- BUBBLES −4M/F ALUMINA
B- INTERMEDIATES −14M/F T-61 ALUMINA
 −48M/F T-61 ALUMINA
C- FINES −325M A-2 ALUMINA, FINE SILICA, KAOLIN

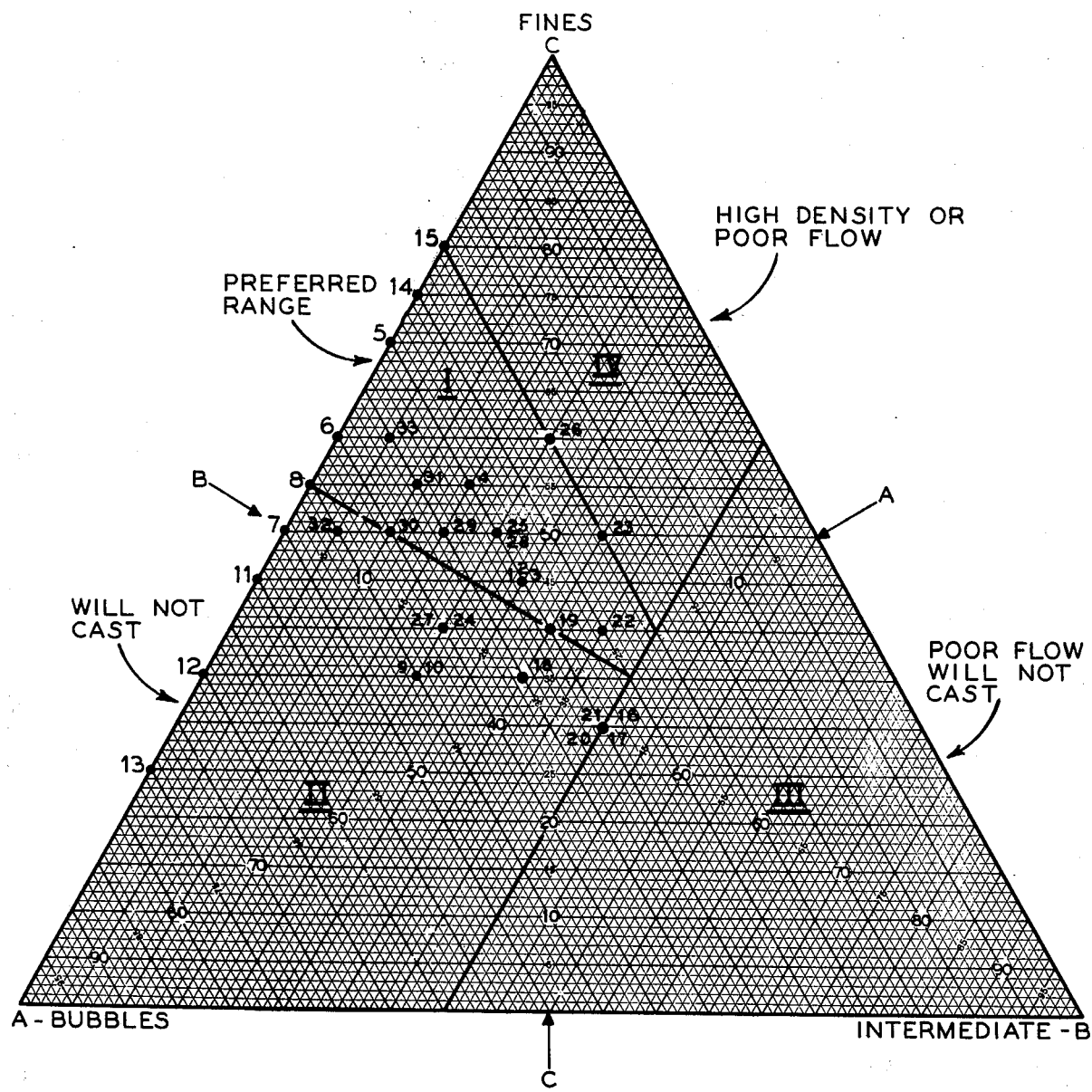

LOW MASS, HIGH ALUMINA-SILICA REFRACTORIES

BACKGROUND OF THE INVENTION

Industrial furnace applications operating at high temperatures require large quantities of structural steel to support furnace enclosures consisting of dense refractories and because of the high heat capacity of the dense refractories, considerable heat energy is unproductively expended in establishing equilibrium conditions between the furnace enclosure and the industrial process occurring within the furnace. This difficulty has been to a large extent alleviated through the use of lightweight refractories such as insulating firebrick, insulating castables, and ceramic fibers with low thermal conductivities.

A similar disadvantage exists with the composition of existing kiln furniture which consists of a heavy refractory, with a density range of between 139 and 189 lbs. per cu. ft. and a chemistry ranging from 48 to 99% alumina. This kiln furniture is used in such applications as in the electronics industry where saggers are used to fire high alumina substrates for integrated circuitry, in the powdered metals industry where high alumina pusher tiles are used to heat powdered metal parts, and in the atomic power industry where a cast high alumina sagger is used to fire uranium dioxide. In the current energy crisis there is a need for a low mass, high alumina refractory having lower heat capacity for achieving savings in energy requirements in the various industrial processes utilizing kiln furniture without a sacrifice in the physical properties of the refractory.

U.S. Pat. No. 2,340,194 teaches a method of manufacture of strong, thick-walled alumina bubbles containing substantial amounts of other substances in addition to aluminum oxide for use in an insulating brick formed by a pressure operation. A pressed refractory would be unsuitable for kiln furniture where a smooth surface is essential. Further, the high weight percentage of alumina bubbles containing significant amounts of titania would not yield the necessary physical properties for use in kiln furniture. Slip casting, disclosed as an alternative to pressure forming of the brick, would also produce kiln furniture with inferior physical properties due to the necessity of using fine aggregates with moderate water conditions. Slip casting would be undesirable with a course aggregate mix due to segregation of the aggregate with the amounts of water required.

U.S. Pat. No. 2,965,506 discloses a composition consisting of alumina bubbles, tabular alumina and calcium aluminate, the calcium aluminate acting as a cementitious ingredient of the mixture which when mixed with water, forms an air-setting cement. This is basically a mixture which is shipped to a job site in dry form and then mixed with water to produce a cement for repair of furnaces and the like but would be totally lacking in the smooth surface requirements of kiln furniture.

U.S. Pat. No. 2,966,421 covers a foaming method to produce an insulating material using a phosphate bond to achieve the set. This type of system will not yield the surface quality or strength required for kiln furniture.

SUMMARY OF THE INVENTION

As the result of an extensive series of laboratory tests and field trials on various refractory mixes, size consist thixotropic combinations of low mass, high alumina refractories were developed having the smooth surface requirement of kiln furniture and low heat capacities compared with currently used dense refractories, and yielding significant energy savings in use. The thixotropic nature of the mix permits the use of a range of aggregate sizing, including alumina bubbles for low mass, and smooth surface characteristics of the finished product is assured by casting in plaster molds.

BRIEF DESCRIPTION OF THE DRAWING

The drawing is a graphical representation on triangular coordinates of a three component size composition of 33 different mixes tested in the laboratory and indicates the preferred compositional range of sizes in the mixes.

DESCRIPTION OF THE PREFERRED EMBODIMENT

In the drawing, the points plotted are the various mixes tested and listed in Table 1, grouped as bubbles, intermediates and fines. For example, Mix No. 1 consists of 30 percent alumina bubbles, 25 percent intermediates and 45 percent fines, all percentages expressed on a weight basis, and terms defined in the drawing.

Alumina bubbles —4M/F are manufactured by commercially known processes. The size designation, (—4M/F), defines the particle size as substantially passing a 4 mesh screen, (Tyler standard screen scale), and finer.

T-61 Alumina is a tabular sintered alumina and is a trade designation of the Aluminum Company of America, Pittsburgh, Pa.

A-2 alumina is calcined alumina, also a trade designation of the Aluminum Company of America.

Fine silica is also known as potters flint.

DARVAN No. 7 is a trademark of the R. T. Vanderbilt Company, Inc., and is a sodium polyelectrolyte containing no phosphates and is used to deflocculate the Kaolin clay.

As shown in Table 1 and the drawing, all mixes in the preferred range (Area I), except mixes 5 and 15 which were marginal and mixes 2 and 3, exhibited excellent thixotropic qualities. Mixes 2 and 3 contained no DARVAN, indicating the need of a defloculant and which was held constant at 140 cc/100 lb. of mix for all subsequent mixes investigated.

TABLE 1.

FORMULAS AND PROPERTIES OF LOW MASS, HIGH ALUMINA REFRACTORIES

| Mix number | 1 | 2 | 3 | 4 | 5 | 6 | 7 | 8 | 9 | 10 | 11 |
|---|---|---|---|---|---|---|---|---|---|---|---|
| Mix Composition, Weight % | | | | | | | | | | | |
| -4M/F Alumina Bubbles | 30 | 30 | 30 | 30 | 30 | 40 | 50 | 45 | 45 | 45 | 55 |
| -14M/F T-61 Alumina | 10 | 10 | 10 | 10 | 0 | 0 | 0 | 0 | 20 | 0 | 0 |
| -48M/F T-61 Alumina | 15 | 15 | 15 | 15 | 0 | 0 | 0 | 0 | 0 | 20 | 0 |
| -325M A-2 Alumina | 28 | 28 | 28 | 28 | 53 | 43 | 33 | 38 | 18 | 18 | 28 |
| -200M Fine Silica | 10 | 10 | 10 | 10 | 10 | 10 | 10 | 10 | 10 | 10 | 10 |
| Kaolin | 7 | 7 | 7 | 7 | 7 | 7 | 7 | 7 | 7 | 7 | 7 |
| Total | 100 | 100 | 100 | 100 | 100 | 100 | 100 | 100 | 100 | 100 | 100 |
| DARVAN No. 7 cc/100 lb. mix | 70 | 0 | 0 | 140 | 140 | 140 | 140 | 140 | 140 | 140 | 140 |
| Water - % | 12.1 | 12.1 | 10.0 | 13.0 | 14.7 | 14.0 | 15.4 | 14.2 | 14.6 | 12.4 | 13.0 |
| Comments | Flowed Well | Would Not Flow | Would Not Flow (Pressed) | Flowed Well | Flowed Well but was Sticky | Flowed Well | Flowed Fair - Grainy | Flowed Well | Would Not Flow - Grainy | Would Not Flow - Grainy | Would Not Flow - Grainy |
| Properties: Fired at 2600F for 15 hrs. | | | | | | | | | | | |
| Density, lb/cu. ft. | 114 | — | 115 | 115 | 115 | 109 | 95 | 107 | — | — | — |
| Modulus of Rupture, psi, at 75F | 1600 | — | 1170 | 2290 | 2260 | 1810 | 1650 | 1900 | — | — | — |

| Mix number | 12 | 13 | 14 | 15 | 16 | 17 | 18 | 19 | 20 | 21 | 22 |
|---|---|---|---|---|---|---|---|---|---|---|---|
| Mix Composition, Weight % | | | | | | | | | | | |
| -4M/F Alumina Bubbles | 65 | 75 | 25 | 20 | 30 | 30 | 30 | 30 | 30 | 31 | 25 |
| -14M/F T-61 Alumina | 0 | 0 | 0 | 0 | 20 | 0 | 15 | 10 | 15 | 35 | 0 |
| -48M/F T-61 Alumina | 0 | 0 | 0 | 0 | 20 | 40 | 20 | 20 | 25 | 0 | 0 |
| -325M A-2 Alumina | 18 | 8 | 58 | 63 | 13 | 13 | 18 | 23 | 13 | 10 | 35 |
| -200M Fine Silica | 10 | 10 | 10 | 10 | 10 | 10 | 10 | 10 | 10 | 17 | 33 |
| Kaolin | 7 | 7 | 7 | 7 | 7 | 7 | 7 | 7 | 7 | 7 | 7 |
| Total | 100 | 100 | 100 | 100 | 100 | 100 | 100 | 100 | 100 | 100 | 100 |
| DARVAN No. 7 cc/100 lb. mix | 140 | — | 140 | 140 | 140 | 140 | 140 | 140 | 140 | 140 | — |
| Water - % | 15.0 | — | 16.0 | 12.8 | 11.6 | 11.7 | 13.4 | 12.0 | 11.8 | 11.5 | — |
| Comments | Would Not Flow | — | Flowed Well | Flowed Poorly | Flowed Fair | Flowed Fair | Flowed Well | Flowed Fair | Flowed Well | Flowed Well | — |
| Properties: Fired at 2600F for 15 hrs. | | | | | | | | | | | |
| Density, lb/cu. ft. | — | — | 110 | 110 | 109 | 109 | 115 | 111 | 113 | 119 | 107 |
| Modulus of Rupture, psi, at 75F | — | — | 540 | 2160 | 1440 | 1020 | 1270 | 1260 | 1430 | 2620 | 2100 |

| Mix number | 23 | 24 | 25 | 26 | 27 | 28 | 29 | 30 | 31 | 32 | 33 |
|---|---|---|---|---|---|---|---|---|---|---|---|
| Mix Composition, Weight % | | | | | | | | | | | |
| -4M/F Alumina Bubbles | 20 | 40 | 30 | 20 | 26 | 27 | 29 | 30 | 31 | 32 | 33 |
| -14M/F T-61 Alumina | 0 | 0 | 0 | 0 | 20 | 40 | 35 | 40 | 35 | 45 | 35 |
| -48M/F T-61 Alumina | 30 | 20 | 20 | 20 | 0 | 0 | 5 | 0 | 0 | 0 | 0 |
| -325M A-2 Alumina | 33 | 23 | 33 | 43 | 20 | 20 | 10 | 10 | 10 | 5 | 5 |
| -200M Fine Silica | 10 | 10 | 10 | 10 | 43 | 33 | 33 | 33 | 38 | 33 | 43 |
| -200M Fine Silica (cont.) | | | | | 10 | 10 | 10 | 10 | 10 | 10 | 10 |
| Kaolin | 7 | 7 | 7 | 7 | 7 | 7 | 7 | 7 | 7 | 7 | 7 |
| Total | 100 | 100 | 100 | 100 | 100 | 100 | 100 | 100 | 100 | 100 | 100 |
| DARVAN No. 7 cc/100 lb. mix | 140 | 140 | 140 | 140 | 140 | 140 | 140 | 140 | 140 | 140 | 140 |
| Water - % | 13.2 | 12.8 | 13.0 | 14.0 | 17.0 | 12.8 | 13.0 | 13.4 | 13.0 | 14.5 | 14.0 |
| Comments | Flowed Well | Flowed Poorly | Flowed Well | Flowed Well | Flowed Fair | Would Not Flow | Flowed Well | Flowed Well | Flowed Well | Flowed Poorly | Flowed Well |
| Properties: Fired at 2600F for 15 hrs. | | | | | | | | | | | |
| Density, lb/cu. ft. | 119 | 99 | 111 | 121 | 114 | 110 | 105 | 103 | 109 | 90 | 107 |
| Modulus of Rupture, psi, at 75F | 2350 | 1630 | 1840 | 1870 | 350 | 2010 | 1950 | 2180 | 2010 | 1480 | 2100 |

The fine silica and the Kaolin were also held constant for all mixes, with the A-2 calcined alumina the variable in the fines. Size consists in Area II did not cast, those in Area III had poor flow characteristics, and those in Area IV had poor flow and high densities. The sizing and composition of those elements in Area I can therefore be considered important as regards consequences since they were thixotropic in nature and produced castings suitable for use as kiln furniture.

As a result of this extensive laboratory program it was determined that low mass, high alumina thixotropic refractories suitable for kiln furniture could be formulated in the following ranges of solid constituents, encompassed by Preferred Range I of the drawing:

| Preferred Composition | % by weight |
|---|---|
| Alumina Bubbles | 20 – 45 |
| Intermediates | 0 – 40 |
| Fines | 35 – 80 |

Based on the laboratory data and supplemented by actual field tests the preferred embodiment of the invention has the following composition and properties and is designated as Mix 29-S:

| | |
|---|---|
| -4M/F Alumina Bubbles | 30% by weight |
| -14M/F T-61 Alumina | 10% by weight |
| -48M/F T-61 Alumina | 15% by weight |
| -325M A-2 Alumina | 28% by weight |
| -200M Fine Silica | 10% by weight |
| Kaolin | 7% by weight |
| DARVAN No. 7 | 140 cc/100 lbs. of mix |
| Water | 12.0 lb./100 lbs. mix |
| Modulus of Rupture, psi | 2090 at 75F |
| Modulus of Rupture, psi | 3020 at 2300F |
| Modulus of Rupture, psi | 1460 at 2800F |

In preparing Mix 29-S, the dry materials are weighed and placed in a paddle mixer, as manufactured by the Hobart Manufacturing Co., Troy, Ohio, Model M-802, and blended for approximately 3 minutes at a low mixer speed. The required quantities of water and DARVAN No. 7 are measured and mixed together. These are then added to the dry mix and stirred for about 1 to 2 minutes. The materials are then mixed for an additional 5 minutes at an intermediate speed of the mixer. The semi-fluid mass is then placed at the entrance of a plaster mold which is vibrated on a shaking table, causing the thixotropic material to flow into the mold. After about 30 to 60 minutes at rest the plaster mold has absorbed sufficient moisture to produce a firming by the action of the Kaolin and the thixotropic characteristics of the materials and the casting is then removed from the mold and air-dried for a minimum of 16 hours. The casting is then heated at 220° F for 24 hours to remove the remaining water and then fired at 2600° F for 15 hours to produce a ceramic bond. The kiln furniture is then ready for shipment and use in the field.

The embodiments of the invention in which an exclusive property or privilege is claimed are defined as follows:

1. A low mass, high alumina-silica refractory mix which upon the addition of a non-phosphate polyelectrolyte deflocculant and from about 11.8 to 16 percent by weight of water is capable of forming a thixotropic casting slip suitable for the production of kiln furniture by vibration casting in a plaster mold, said mix consisting essentially of from 20 percent to 45 percent —4M/F alumina bubbles, from 0 percent to 40 percent —14M/F and —48M/F tabular sintered alumina, and from 35 percent to 80 percent —325M calcined alumina, —200M fine crystalline silica and kaolin, of which 10 percent is silica and 7 percent is kaolin, all percentages expressed on a weight basis.

2. A low mass, high alumina-silica refractory mix which upon the addition of a non-phosphate polyelectrolyte deflocculant and from about 11.8 to 16 percent by weight of water is capable of forming a thixotropic casting slip suitable for the production of kiln furniture by vibration casting in a plaster mold, said mix consisting essentially of 30 percent —4M/F alumina bubbles, 10 percent —14M/F tabular sintered alumina, 15 percent —48M/F tabular sintered alumina, 28 percent —325M calcined alumina, 10 percent —200M fine crystalline silica, and 7 percent kaolin, all percentages based on a weight basis.

3. A method of producing a low mass, high alumina-silica product suitable for use as kiln furniture comprising blending a dry mixture consisting essentially of from 20 percent to 45 percent —4M/F alumina bubbles, from 0 percent to 40 percent —14M/F and —48M/F tabular sintered alumina, and from 35 percent to 80 percent —325M calcined alumina, —200M fine crystalline kaolin, of which 10 percent is silica and 7 percent is kaolin, adding a mixture of non-phosphate polyelectrolyte deflocculant and water to the dry mixture, the water being about 11.8 to 16 percent by weight of the dry mixture, and mixing together, placing the resultant thixotropic combination of materials on a plaster mold, vibrating the resultant combination and the plaster mold causing the materials to flow into the mold, stopping the vibration and permitting the materials to become firm, removing the casting from the mold and air-drying, heating and firing the casting.

* * * * *

UNITED STATES PATENT AND TRADEMARK OFFICE
CERTIFICATE OF CORRECTION

PATENT NO. : 4,117,055
DATED : September 26, 1978
INVENTOR(S) : Walter Howard Alexanderson It is certified that error appears in the above-identified patent and that said Letters Patent are hereby corrected as shown below:

Column 6, Line 40 should read -

-325M calcined alumina, - 200M fine crystalline silica and kaolin,

Signed and Sealed this

Ninth Day of January 1979

[SEAL]

Attest:

RUTH C. MASON
Attesting Officer

DONALD W. BANNER
Commissioner of Patents and Trademarks